United States Patent [19]

Westergaard et al.

[11] 4,409,782
[45] Oct. 18, 1983

[54] MULTIPLE-PATTERN TREE SHAKING MECHANISM

[75] Inventors: Rod Westergaard, Ceres; Lou Morton, Bakersfield; Ken Zeiders, Merced, all of Calif.

[73] Assignees: Westech Hydraulics, Ceres; Tenneco West, Bakersfield, both of Calif.

[21] Appl. No.: 340,935

[22] Filed: Jan. 20, 1982

[51] Int. Cl.³ ............................................. A01D 46/26
[52] U.S. Cl. ...................................... 56/328 TS; 74/61
[58] Field of Search ................. 56/328 TS; 74/61, 87; 366/128

[56] References Cited

U.S. PATENT DOCUMENTS

| | | | |
|---|---|---|---|
| 2,144,382 | 1/1939 | Lincoln et al. | 74/61 |
| 3,120,091 | 2/1964 | Gould et al. | 56/328 |
| 3,220,268 | 11/1965 | Brandt, Jr. | 74/87 |
| 3,221,567 | 12/1965 | Brandt, Jr. | 74/87 |
| 3,335,556 | 8/1967 | Edgemond, Jr. | 56/328 |
| 3,377,786 | 4/1968 | Edgemond, Jr. | 56/328 |
| 3,457,712 | 7/1969 | Gould et al. | 56/328 |
| 3,494,654 | 2/1970 | Gould et al. | 294/103 |
| 3,548,578 | 9/1968 | Shipley, Jr. | 56/328 |
| 3,564,825 | 2/1971 | Gould et al. | 56/328 |
| 3,640,508 | 2/1972 | Reibig | 259/72 |
| 3,771,768 | 11/1973 | Gebendinger | 259/1 R |
| 3,780,510 | 12/1973 | Tompkins | 56/328 |
| 3,948,109 | 4/1976 | Elonen | 74/61 |
| 4,114,463 | 9/1978 | Garden et al. | 74/61 |
| 4,128,986 | 12/1978 | Santarelli | 56/328 TS |
| 4,170,100 | 10/1979 | Hood, Jr. et al. | 56/328 |
| 4,211,121 | 7/1980 | Brown | 74/87 |

FOREIGN PATENT DOCUMENTS 743629 6/1980 U.S.S.R. .................. 56/328 TS

Primary Examiner—Paul J. Hirsch
Attorney, Agent, or Firm—Townsend & Townsend

[57] ABSTRACT

A shaker head including three eccentric weights rotatably mounted on a common shaft is carried by a tractor. A mechanism for manipulating the shaker head allows the user to engage the trunk or limbs of a tree having fruit, nuts or the like ready to be harvested. The eccentric weights are driven by various combinations of motors and sheaves to impart a plurality of distinct shaking patterns to the tree.

12 Claims, 12 Drawing Figures

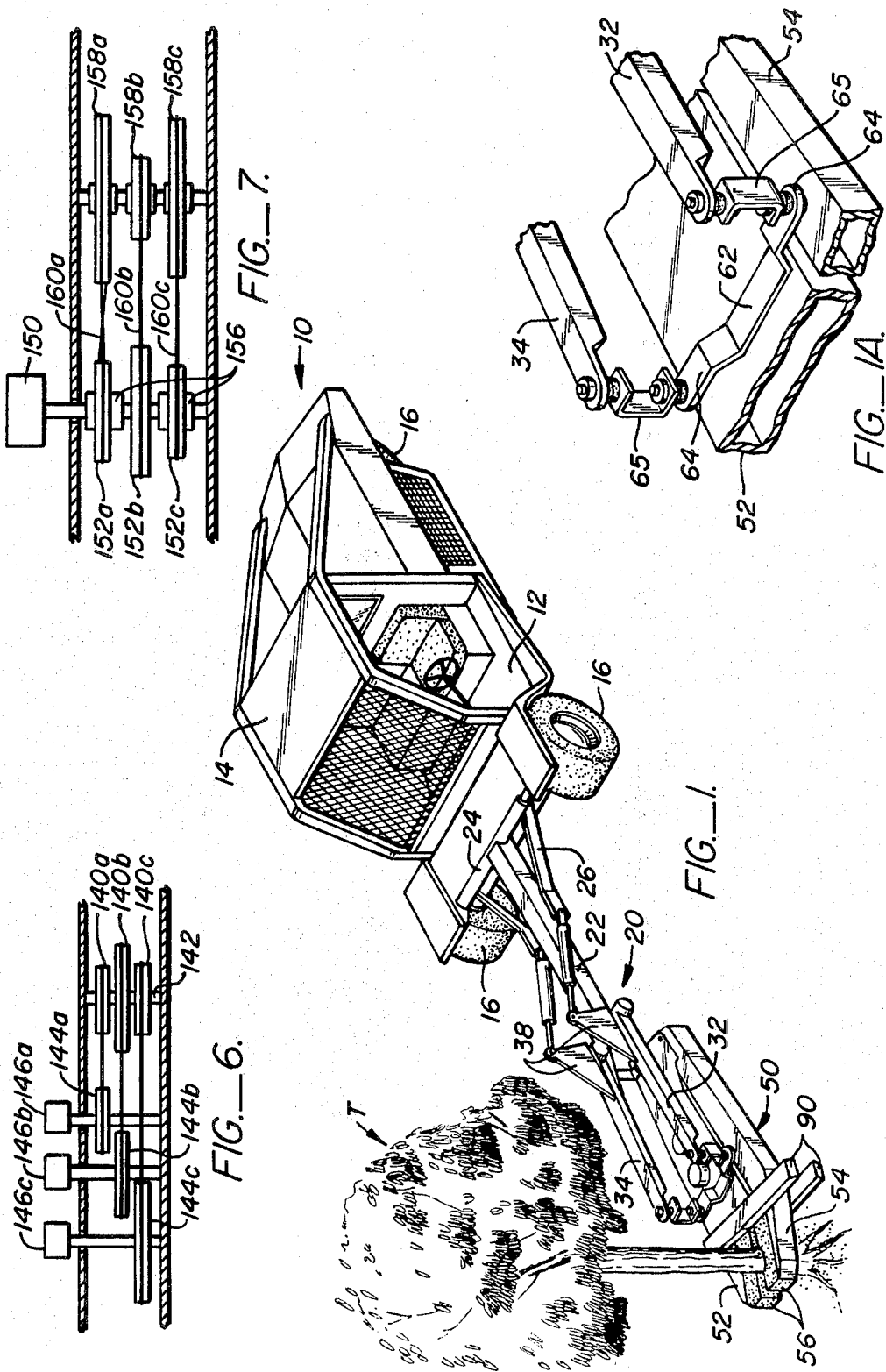

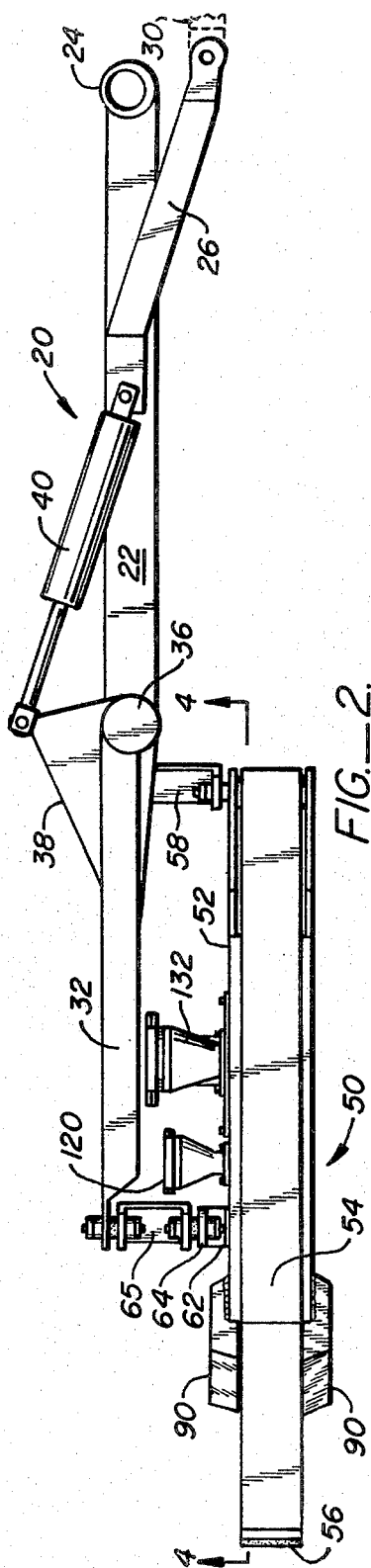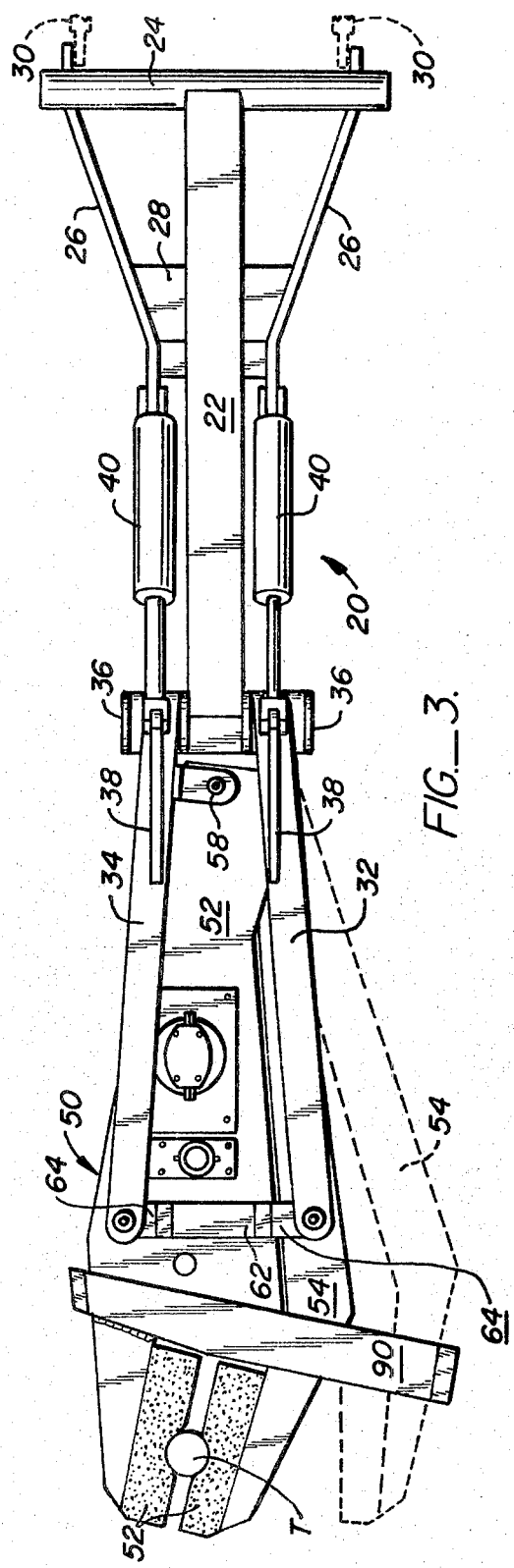

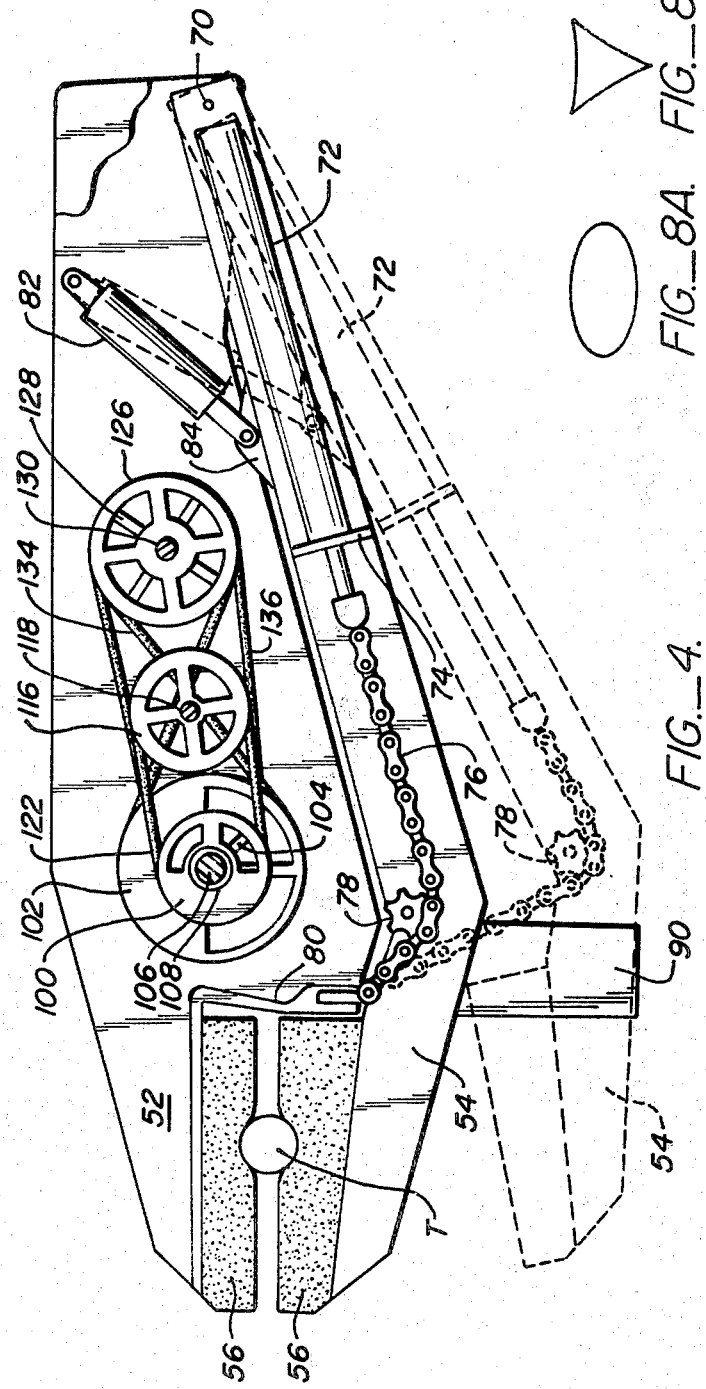
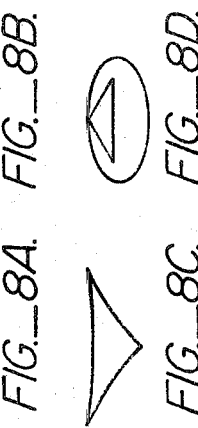
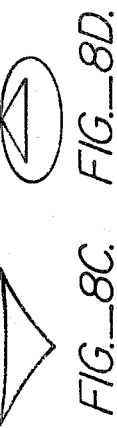

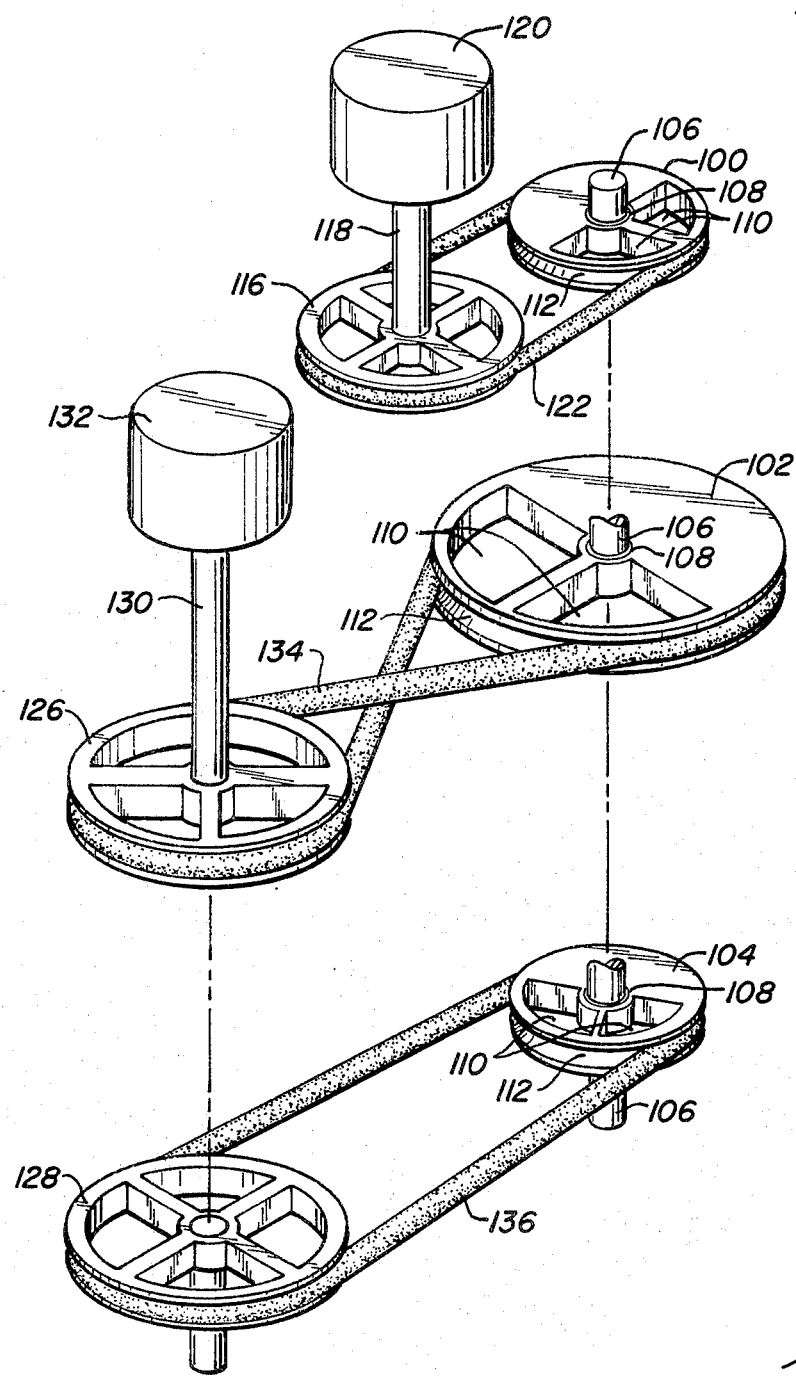
FIG._5.

MULTIPLE-PATTERN TREE SHAKING MECHANISM

BACKGROUND OF THE INVENTION

1. Field of the Invention

The present invention relates generally to inertial shakers, and more particularly to an eccentric weight shaker head for use in harvesting fruits, nuts, and the like from trees.

2. Description of the Prior Art

The ability to remove fruit and nuts by shaking the trunk or limbs of a fruit-bearing tree is well known. Heretofore, various mechanical devices for engaging and imparting vibrational energy to a tree have been developed.

Perhaps the most simple shaker mechanism is a jaw or a clamp having a single eccentric weight rotatably mounted thereon. By clamping a portion of the tree, typically the trunk or a large branch, a circular vibration pattern can be induced by rotating the eccentric weight in either direction. Although the frequency and amplitude of vibration may be varied by changing the speed of rotation, it has been found that such a circular vibration pattern often allows a large portion of fruit or nuts to remain on the tree, particularly with nuts such as almonds which are firmly attached to the tree.

By mounting a pair of eccentric weights on the clamping mechanism, the vibrational pattern induced in the tree can be varied depending on the manner in which the weights are driven. Most commonly, the weights are driven synchronously, to induce a linear vibrational pattern. U.S. Pat. Nos. 3,221,567 and 3,548,578 disclose examples of such machines.

When employing two eccentric weights, variable patterns may be induced in the tree by providing weights having different masses, by driving the eccentric weights nonsynchronously, or by nonsynchronously driving weights having different masses. Such sytems are disclosed in U.S. Pat. Nos. 4,170,100; 3,640,508 and 3,548,578.

While a variety of distinct shaking patterns can be achieved with the prior art shaking mechanisms cited hereinabove, it is typically found that use of a single shaking pattern will leave fruit remaining on a tree even after extended periods of shaking. This is true even where the shaking pattern comprises two distinct patterns superimposed by a pair of separately rotated eccentric weights. In general, fruit remains on the tree because portions of the branch system (referred to as nodal locations) remain stationary while the tree is being vibrated. While this condition is somewhat alleviated by a variable amplitude, variable frequency shaking pattern, it is not eliminated entirely.

SUMMARY OF THE INVENTION

The present invention allows the user to select from a plurality of distinct shaking patterns so that by subjecting a tree to two or more of these patterns, substantially complete removal of fruit from the tree can be achieved. As used hereinafter, the term fruit will be understood to include all tree-borne comestibles which may be collected by shaking the tree.

By utilizing at least three eccentric weights and driving each weight either alone, or in various combinations with the other two weights, a wide variety of shaking patterns can be achieved. By further providing that the weights may be independently driven at varying frequencies and in either direction, the diversity in the patterns imparted to the trees is even greater.

In the preferred embodiment, a tractor includes an adjustable support frame at its front end. A shaker head is resiliently suspended from the adjustable frame and includes a pair of jaws for grasping a tree trunk. The shaker head includes three eccentric weights mounted coaxially on a common shaft. The weights are free to rotate in either direction and such rotation imparts a centrifugal force to the shaker head which in turn imparts a corresponding force to the tree.

Various means may be provided for rotating the eccentric weights. In one embodiment, each weight is driven by a separate motor coupled to the weight by a drive belt. Alternatively, the weights can be driven by a single motor, with a clutching device, typically a magnetic clutch, used to selectively engage individual weights. While this latter approach is less costly, a more limited number of shaking patterns are available.

In the particularly preferred embodiment, two of the weight s are driven from a single motor. By providing different combinations of sheave diameter to eccentric weight diameter, the two weights can be driven in a preselected phased relationship to produce shaking pattern which varies over a particular cycle. By selectably engaging the third weight with a separate motor, the shaking pattern induced by the paired weights can be abruptly changed. It has been found that such interruption of the shaking pattern changes the location of the nodal points in the branches of the tree and results in the increased removal of the fruit. Moreover, since the third weight is driven by a separate motor, differing shaking patterns can be induced depending on the direction the third weight is rotated.

Using the shaking head of the present invention, the operator has a variety of options which may be exercised depending on the tree being harvested. In the case of young, smaller trees it will be often be sufficient to use only one of the smaller weights which can impart sufficient vibration to harvest the tree, without damaging the tree. With larger trees, typically the operator will first subject the tree to the variable pattern induced by the paired weights driven by the first motor. After a short time, much of the fruit will be removed from the tree and fall to the ground.

In the usual case, however, even after extended application of the vibrational force, a portion of the fruit will remain on the tree. In that case, the operator can acutate the third eccentric weight in a first direction. Initiation of the third weight abruptly alters the shaking pattern and typically will remove substantially all the fruit remaining on the tree. If a significant amount of fruit remains, the operator can initiate the motor in the opposite direction, inducing yet a third distinct vibrational pattern in the tree. It has been found that by the sequential application of such distinct shaking patterns, that substantially all fruit is removed in the vast majority of cases.

Thus, we provide a shaking mechanism which is capable of substantially complete fruit removal from a tree during a relatively short period. In particular, we provide a shaking mechanism which is capable of selectively applying distinct shaking patterns which can be selected by observing the response of the tree to the particular pattern applied.

The novel features which are characteristic of the invention, as to organization and method of operation, together with further objects and advantages thereof will be better understood from the following description considered in conjunction with the accompanying drawings in which a preferred embodiment of the invention is illustrated by way of example. It is to be expressly understood, however, that the drawings are for the purpose of illustration and description only and are not intended as a definition of the limits of the invention.

BRIEF DESCRIPTION OF THE DRAWINGS

FIG. 1 is an isometric view illustrating the shaker head of the present invention mounted on a tractor.

FIG. 1A is a detailed view illustrating the suspension and the shaker head from the adjustable support frame.

FIG. 2 is a side elevational view of the shaker head of the present invention suspended from the adjustable support frame.

FIG. 3 is a top plan view of the shaker head and adjustable support frame.

FIG. 4 is a sectional view taken along line 4—4 of FIG. 2.

FIG. 5 is an exploded view illustrating the eccentric weight drive assembly of a first embodiment of the present invention.

FIG. 6 illustrates a second embodiment of the eccentric weight drive assembly of the present invention.

FIG. 7 illustrates a third embodiment of the eccentric weight drive assembly of the present invention.

FIGS. 8A-8D illustrate the variety of shaking patterns which can be achieved using the first embodiment of the eccentric drive assembly.

DESCRIPTION OF THE PREFERRED EMBODIMENT

Referring to FIG. 1, a tractor 10 includes a driver compartment 12 having a protective covering 14. The tractor 10 typically includes three wheels 16, with a single wheel in the rear being steerable to provide maximum maneuverability. Such tractors are well known in prior art and will not be described further.

Referring now also to FIGS. 2 and 3, a vertically adjustable support frame 20 includes a main channel 22 pivotally secured to the front end of the tractor 10 by a bearing member 24. The bearing member 24 is received on a shaft (not shown) extending across the front end of the tractor 10. A pair of brackets 26 are disposed symmetrically about the main channel 22 and attached thereto by a plate 28 (FIG. 3). The brackets 26 extend generally downward from the main channel 22 and are connected at their rear ends (to the right as viewed in FIGS. 2 and 3) to a pair of hydraulic rams 30 illustrated in phantom and FIGS. 2 and 3. The cylinder end of the rams 30 are connected to the underside of the tractor 10 so that the brackets 26 can be reciprocated forward and backward relative to the tractor. In this way, the support frame 20 can be caused to pivot about the shaft running through bearing member 24 so that the forward end of the support frame can be raised and lowered relative to the tractor 10.

A pair of suspension arms 32, 34 are pivotally mounted from the forward end of the main channel 22 and are free to independently pivot about a common axis defined by bearing members 36. A triangular plate 38 is secured to the upper, rear surface of each of the arms 32, 34. A second pair of hydraulic rams 40 are connected at their cylinder end to the forward end of brackets 26 and at their rod ends to the upper corner of the triangular plates 38. Thus, independent actuation of either ram 40 can cause the associated suspension arm 32 or 34 to pivot around bearing 36. Simultaneous actuation of both rams 40 can, of course, cause the arms 32, 34 to move in unison about their common pivotal axis.

A shaker head 50 is suspended from the suspension arms 32, 34 so that manipulation of the adjustable support frame 20 allows the operator to adjust the shaker head to a desired orientation, as described in more detail hereinafter. The shaker head comprises a pair of jaws, stationary jaw 52 and movable jaw 54, each having resilient clamping pads 56 mounted on its forward end. The shaker head 50 includes a mechanism for opening and closing the jaws to allow the jaws to grasp the trunk of a tree T, as shown in FIG. 1. Additionally, the shaker includes a mechanism for inertially inducing a variety of shaking patterns in the shaking head, which in turn imparts vibration to the tree T. Each of these mechanisms will be discussed in detail hereinafter.

The shaker head 50 is resiliently suspended from the adjustable support frame 20 so that the tractor 10 is substantially isolated from the vibration thereof. The rear of the shaker head 50 is attached to suspension arm 34 by a C-bracket 58. The C-bracket 60 is resiliently mounted at its lower end so that some freedom of motion is allowed the shaker head 50 relative to the support frame 20.

A fixed bracket 62 is secured to the forward, upper surface of the stationary jaw 52 (see FIG. 1A). Bracket 62 terminates at each end in an attachment ear 64, one of which is generally vertically aligned with the forward ends of each suspension arms 32 and 34. C-brackets 65 are resiliently secured at one end to the suspension arm 32 or 34 and at the other end to the aligned attachment ear 64. In this manner, the shaker head 50 can be manipulated by actuating hydraulic rams 40.

Only the stationary jaw 52 is secured directly to the support frame 20 in the manner just described. Thus, the movable jaw 54 is free to pivot outward and inward to grasp the tree T, as will be described in more detail hereinafter.

Referring now in particular to FIG. 4, the movable jaw 54 is pivotally attached at its rear end to the stationary jaw 52 by a pivot pin 70. A hydraulic ram 72 is mounted within the movable jaw 54 on a bracket 74. A chain 76 passes around a sproket 78 mounted on jaw 54 and is secured at one end to the rod of hydraulic ram 72 and at the other end to an L-shaped bracket 80 secured to the forward end of the stationary jaw 52. Thus, by retracting the rod, the chain 76 is drawn inward causing the movable jaw 54 to close toward the stationary jaw 52. The sprocket 78 is firmly secured to the movable jaw and able to withstand the substantial sheer force generated when the jaws 52, 54 are tightly clamped on a tree. The L-shaped bracket 78 extends around the resilient clamping pad 56 to directly apply the clamping force supplied by the chain 76 to the tree.

A second hydraulic ram 82 is applied to open the jaws 52, 54. The ram 82 is connected at its cylinder end to the stationary jaw 54 and at its rod end to an ear 84 projecting from the movable jaw 54. Thus, by extending the ram, the movable jaw 54 is moved outward from the stationary jaw 52.

As best illustrated in FIG. 1, a pair of horizontal tracks 90 define a path for travel of the movable jaw 54 as it is reciprocated, as described hereinbefore. The tracks 90 provide support for the movable jaw 54 when it is extended outward from the stationary jaw 52 and assure that excessive stress is not placed on the pivotal connection 70.

Referring now in particular to FIGS. 4 and 5, the drive assembly of the shaker head 50 comprises three eccentric weights 100, 102, 104 mounted on a common shaft 106. Each eccentric weight 100, 102, 104 is mounted in an individual bearing 108 so that the weights are free to rotate relative to the shaft and independently of the remaining weights.

Each weight 100, 102, 104 is circular and includes a pair of cut-out portions 110 which results in an asymmetric weight distribution. Thus, by rotating any one of the weights, a centrifugal force is imparted to the shaft 106, and by rotating any two or more of the weights, two or more forces will be superimposed on the shaft 106.

The eccentric weights can be formed in a variety of shapes and it is necessary only that the weight be distributed asymmetrically with respect to the axis of the support shaft. For example, the eccentric weights could be hammer-shaped with a relatively narrow post extending radially outward from the shaft and terminating in a heavy weight or bob. Such construction, which distributes the major portion of the weight a maximum distance from the shaft, provides the greatest centrifugal force for a given radius. Such a construction, however, requires a separate drive sheave associated with each of the weights since the hammer itself cannot be directly driven.

The eccentric weights 100, 102, 106 illustrated in FIG. 5 include a circular perimeter defining a channel 112 which is able to receive a drive belt to rotate the weight. A drive sheave 116 is secured to the lower end of a drive shaft 118 which, in turn, is driven by hydraulic motor 120. The motor 120 may be actuated in either direction by controls (not shown) located in the driver compartment 12 of the tractor 10. The sheave 116 is coupled to eccentric weight 100 by a drive belt 122.

Drive sheaves 126 and 128 are similarly mounted on a drive shaft 130 projecting downward from a second hydraulic motor 132. Drive sheave 126 is coupled to the second eccentric weight 102 by a drive belt 134. The drive belt 134 includes a single twist so that rotation of the drive sheave 126 in a first direction causes the eccentric weight 102 to rotate in the opposite direction. Because of the twist, it is necessary that the drive shaft 130 be slightly inclined relative to the common shaft 106. Such inclination allows clearance between the two sections of the drive belt at the point where they cross. Drive sheave 128 is coupled to the lowermost eccentric weight 104 by a drive belt 136. The drive belt 136 is not twisted so that rotation on the drive sheave 128 causes eccentric weight 104 to rotate in the same direction. Thus, rotation of drive shaft 130 by hydraulic motor 132 in either direction causes eccentric weights 102 and 104 to rotate in opposite directions. Moreover, since eccentric weight 100 can be driven in either direction by a separate hydraulic motor 120 four distinct shaking patterns can be generated, as described in more detail hereinafter.

The dimensions of both eccentric weights 100, 102, 104 and the sheaves 116, 126, 128 as well as the speed at which the motors 120, 132 are driven determine the frequency pattern of the forces generated and the shaker head 50. Additionally, the magnitude of the forces generated depends on the weight of each eccentric weight and the location of its center of gravity. The value of each of these parameters can vary widely and will depend on the particular tree to be harvested.

Referring now to FIG. 6, an alternative drive system includes three eccentric weights 140 mounted on a common shaft 142. Each of the eccentric weights 140 is coupled to a separate drive sheave 144 driven by a separate motor 146. In this way, each of the eccentric weights 140 can be independently driven in either direction, allowing a large variety of shaking patterns.

A second alternative drive system employing a single drive motor 150 is illustrated in FIG. 7. Three drive sheaves 152 are mounted on a common drive shaft 154 driven by the motor 150. As illustrated, two of the drive sheaves 152a and 152c are coupled to the drive shaft 154 by clutch devices 156, typically magnetic clutches, actuated from the driver compartment 12. Each of the drive sheaves 52 is coupled to a single eccentric weight 158 by a drive belt 160 and, typically one of the drive belts 160 will be twisted to rotate the associated eccentric weight in the opposite direction. In this way, when motor 150 is driven, eccentric weight 158 will always be rotated. If desired, the user can initiate rotation of either eccentric weight 158a or 158c, or both, to alter the shaking pattern to remove fruit which is resistant to removal by the basic shaking pattern.

Referring again to the embodiment of FIG. 5, the operation of the shaker head 50 will be described. After the tractor 10 has approached the tree and the clamping pads 56 have engaged the tree T, the user is ready to activate the shaking head 50. For small trees, it will often be sufficient to rotate the smaller eccentric weight 100. Although such rotation will induce a fixed frequency, low amplitude vibratory pattern in the tree, this is often sufficient to remove virtually all of the fruit. Application of a greater vibratory force can damage smaller trees.

For mature trees, however, the initial step will usually be actuating motor 132 which rotates eccentric weights 102 and 104 in opposite directions. For the embodiment illustrated, with the heavier eccentric weight 102 rotating at a slower speed than the lighter eccentric weight 104, the shaking pattern will be approximately triangular, as illustrated in FIG. 8B. Such a triangular pattern is usually effective in removing a substantial portion of fruit from the tree.

To remove the remaining fruit from the tree, the user is able to selectively engage the third eccentric weight 100 to alter the basic shaking pattern illustrated in FIG. 8B. By rotating eccentric weight 100 in the same direction as the high speed weight 104, a triangular pattern having an elongated side, as illustrated in FIG. 8C, is achieved. By rotating eccentric weight 100 in the opposite direction from that of the high speed eccentric weight 104, a more complex pattern as illustrated in FIG. 8D is obtained. By selectively applying each of the shaking patterns illustrated in FIGS. 8A-D, the user is able to remove the substantial majority of fruit from most trees harvested. Moreover, such substantially complete removal is obtained by merely adjusting the shaking pattern by changing a switch in the driver compartment of the harvester. Only when the user observes that fruit remains on the tree after being subjected to a first shaking pattern, is it necessary to try one of the alternate patterns. In the rare case where the second pattern has been unable to effect complete removal, the user can initiate a third, distinct pattern with a very high likelihood of success.

While a preferred embodiment of the present invention is illustrated in detail, it is apparent that modifications and adaptations of that embodiment will occur to those skilled in the art. However, it is to be expressly understood that such modifications and adpatations are within the spirit and scope of the present invention, as set forth in the following claims.

What is claimed is:

1. In a tree shaker having a mobile frame and means for engaging a tree, an improved shaker mechanism comprising:
    a shaft secured to the engaging means;
    at least three eccentric weights rotatably mounted on the shaft; and
    means for rotating each of the weights alone or in combination with one another, said means being capable of reversing the rotational direction of at least one of the weights without changing the rotational direction of the other weights.

2. A shaker mechanism as in claim 1, wherein the means for rotating the weights comprises:
    three sheaves, one being associated with each of the eccentric weights;
    a belt operatively connecting each sheave with its associated eccentric weight; and
    means for selectively rotating the sheaves.

3. A shaker mechanism as in claim 2, wherein the eccentric weights have a substantially circular perimeter, said perimeter defining a channel for receiving the associated belt.

4. A shaker mechanism as in claim 1, wherein said means for rotating the weights comprises:
    a first motor having a drive shaft;
    a single sheave fixedly secured to the first drive shaft and rotationally coupled to one of the eccentric weights;
    a second motor having a drive shaft; and
    a pair of sheaves fixedly secured to the second drive shaft, each sheave being rotationally coupled to one of the remaining eccentric weights.

5. A shaker mechanism as in claim 4, wherein the eccentric weights are coupled to the second drive shaft in such a manner that said weights rotate in opposite directions when the second motor is driven.

6. A shaker mechanism comprising:
    means for gripping a work object;
    at least three eccentric weights rotatably mounted on the means for gripping, said weights being coaxially aligned; and
    means for selectively rotating the weights in either direction so that a plurality of different shaking patterns can be imparted to the work object.

7. A shaker mechanism as in claim 6, wherein the means for rotating the weights comprises:
    three sheaves, one being associated with each of the eccentric weights;
    a belt operatively connecting each sheave with its associated eccentric weight; and
    means for selectively rotating the sheaves in either direction.

8. A shaker mechanism as in claim 7, wherein the eccentric weights have a substantially circular perimeter, said perimeter defining a channel for receiving the associated belt.

9. A shaker mechanism as in claim 6, wherein said means for rotating the weights comprises:
    a first motor having a drive shaft;
    a single sheave fixedly secured to the first drive shaft and rotationally coupled to one of the eccentric weights;
    a second motor having a drive shaft; and
    a pair of sheaves fixedly secured to the second drive shaft, each sheave being rotationally coupled to one of the remaining eccentric weights.

10. A shaker mechanism as in claim 9, wherein the eccentric weights are coupled to the second drive shaft in such a manner that said weights rotate in opposite directions when the second motor is driven.

11. A method for removing fruit from a tree, said method comprising:
    engaging the tree with a shaker head having three eccentric weights rotatably mounted thereon;
    rotating two of the eccentric weights in opposite directions to impart a first shaking pattern to the tree; and
    after a first portion of fruit has been removed, rotating the third eccentric weight in a preselected direction to alter the shaking pattern and remove a second portion of fruit.

12. A method as in claim 11, further comprising the following steps:
    observing the degree of fruit removal which has been effected; and
    reversing the rotational direction of the third eccentric weight if fruit removal is inadequate.

* * * * *